(12) United States Patent
Takita et al.

(10) Patent No.: US 10,602,093 B2
(45) Date of Patent: Mar. 24, 2020

(54) VIDEO CONFERENCE APPARATUS

(71) Applicant: Panasonic Intellectual Property Management Co., Ltd., Osaka (JP)

(72) Inventors: Takeshi Takita, Fukuoka (JP); Naoki Koga, Fukuoka (JP); Masayuki Kumazawa, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/251,588

(22) Filed: Jan. 18, 2019

(65) Prior Publication Data

US 2019/0268569 A1 Aug. 29, 2019

(30) Foreign Application Priority Data

Feb. 27, 2018 (JP) .................. 2018-032819

(51) Int. Cl.
*H04N 7/15* (2006.01)
*H04W 4/02* (2018.01)
*G06F 3/16* (2006.01)
*H04L 29/06* (2006.01)

(52) U.S. Cl.
CPC ............ *H04N 7/152* (2013.01); *G06F 3/165* (2013.01); *H04L 65/403* (2013.01); *H04W 4/025* (2013.01)

(58) Field of Classification Search
CPC combination set(s) only.
See application file for complete search history.

(56) References Cited

U.S. PATENT DOCUMENTS

| 2006/0233120 | A1* | 10/2006 | Eshel ................. H04L 12/1822 370/260 |
| 2009/0315975 | A1* | 12/2009 | Wiener ................. H04N 7/152 348/14.09 |
| 2013/0100239 | A1* | 4/2013 | Liang ....................... H04N 7/15 348/14.08 |
| 2014/0371892 | A1 | 12/2014 | Takahashi |

FOREIGN PATENT DOCUMENTS

JP 2014-241525 12/2014

* cited by examiner

*Primary Examiner* — Phung-Hoang J Nguyen
(74) *Attorney, Agent, or Firm* — Wenderoth, Lind & Ponack, L.L.P.

(57) ABSTRACT

An objective is to prevent occurrence of video loop even in a case where a plurality of video conference apparatuses are connected in cascade. In a cascade mode, that is, in a case where a location of a video conference apparatus is an intermediate location, video and speech selector/combiner 105 selects video data of a location (location where a speech is made) of a maximum sound-volume among connection locations other than the location of the video conference apparatus and a cascade destination. Communication controller 103 transmits video data of the location of the maximum sound-volume to video conference apparatus 10 of the cascade destination and transmits the video data transmitted from video conference apparatus 10 of the cascade destination to video conference apparatuses 10 in a connection location other than the cascade destination.

3 Claims, 6 Drawing Sheets

VIDEO CONFERENCE APPARATUS

CROSS REFERENCE TO RELATED APPLICATIONS

This application is entitled to the benefit of Japanese Patent Application No. 2018-032819, filed on Feb. 27, 2018, and the disclosure of which including the specification, drawings and abstract is incorporated herein by reference in its entirety.

TECHNICAL FIELD

The present invention relates to video conference apparatuses of a video conference system connecting between a plurality of locations.

BACKGROUND ART

Video conference systems each connecting between a plurality of video conference apparatuses and conducting a video conference have been known (e.g., Patent Literature (hereinafter, referred to as "PTL") 1). In general, a video conference apparatus installed in one hosting location (master location) connects, in a one-to-one relationship, to each of video conference apparatuses installed in client locations (slave locations), respectively, in a video conference system.

The video conference apparatus in the hosting location generates combined video data by combining video data obtained by capturing the hosting location with video data received from each client location such that each video data is displayed in a division region of the screen, and displays the combined image data. Further, the video conference apparatus of the hosting location transmits the combined video data to each of the video conference apparatuses of the respective client locations. The video conference apparatuses of the respective client locations each display the combined video data received from the video conference apparatus of the hosting location.

CITATION LIST

Patent Literature

PTL 1: Japanese Patent Application Publication No. 2014-241525

SUMMARY OF INVENTION

Technical Problem

In the video conference system described above, when a video conference apparatus of another client location is additionally connected in cascade to a video conference apparatus of a client location, a video loop to be described hereinafter occurs. No video conference apparatus that solves this problem of video loops has ever been disclosed.

One aspect of the present disclosure facilitates providing a video conference apparatus capable of preventing an occurrence of video loop even in a case where a plurality of video conference apparatuses are connected in cascade.

Solution to Problem

A video conference apparatus according to one aspect of the present disclosure is a video conference apparatus that simultaneously connects to each of a plurality of video conference apparatuses of other locations, the video conference apparatus including: a video inputter that obtains video data of a location of the video conference apparatus; a communication controller that receives video data of each of the other locations from the plurality of video conference apparatuses of the other locations; and a selector/combiner that generates combined video data resulting from combining the video data of the location of the video conference apparatus and the video data of each of the other locations, or that selects one video data from among the video data of the video conference apparatus and the video data of each of the other locations, in which, in a case where the video conference apparatus is in a client location located in middle of a cascade connection in which the video conference apparatus connects to, as a cascade destination, a video conference apparatus of a hosting location or an upstream side video conference apparatus, while the video conference apparatus also connects to a video conference apparatus of a location other than the cascade destination, the upstream side video conference apparatus being a video conference apparatus linking to the hosting location, the selector/combiner selects one of video data of the location of the video conference apparatus and a location other than the cascade destination, and the communication controller transmits the video data selected by the selector/combiner to a video conference apparatus of the cascade destination and transmits video data received from the video conference apparatus of the cascade destination to the location other than the cascade destination.

It should be noted that general or specific embodiments may be implemented as a system, an apparatus, a method, an integrated circuit, a computer program, or a storage medium, and/or any selective combination of the system, the apparatus, the method, the integrated circuit, the computer program, and the storage medium.

Advantageous Effects of Invention

According to the present disclosure, an occurrence of video loop can be prevented even in a case where a plurality of video conference apparatuses are connected in cascade.

Additional benefits and advantages of one aspect of the present disclosure will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings as appropriate. Meanwhile, a more than necessary detailed description may be omitted. For example, a detailed description of an already well-known matter or an overlapping description for substantially identical components may be omitted. Such omission is to avoid rendering the following description unnecessarily redundant and to facilitate understanding of a person skilled in the art.

Note that, the accompanying drawings and the following description are provided for a person skilled in the art to sufficiently understand the present disclosure and are not intended to limit the subject matter recited in the claims.

Embodiments

<Configuration of Video Conference System>

First, a detailed description will be given of a configuration of a video conference system including video conference apparatus 10 according to an embodiment of the present disclosure with reference to FIG. 1.

Video conference apparatuses 10 are respectively installed in locations. Video conference apparatus 10-1 installed in a hosting location (location number 1) connects to video conference apparatuses 10-2 to 10-4 installed respectively in client locations (location numbers 2 to 4), and transmits/receives speech data and video data to and from video conference apparatuses 10-2 to 10-4 via network 20.

Video conference apparatus 10-1 of the hosting location generates combined video data by combining video data obtained by capturing the hosting location with video data received from each of video conference apparatuses 10-2 to 10-4 of the client locations, such that each video data is displayed in a division region of the screen, and displays the combined video data.

Video conference apparatus 10-1 transmits the combined video data to each of video conference apparatuses 10-2 to 10-4. Video conference apparatuses 10-2 to 10-4 display the combined video data received from video conference apparatus 10-1.

In this embodiment, video conference apparatuses 10-4 installed in the client location (location number 4) further connects via network 20 to video conference apparatuses 10-5 and 10-6 installed respectively in other client locations (location numbers 5 and 6), and transmits/receives speech data and video data to and from video conference apparatuses 10-5 and 10-6.

Figure 1:
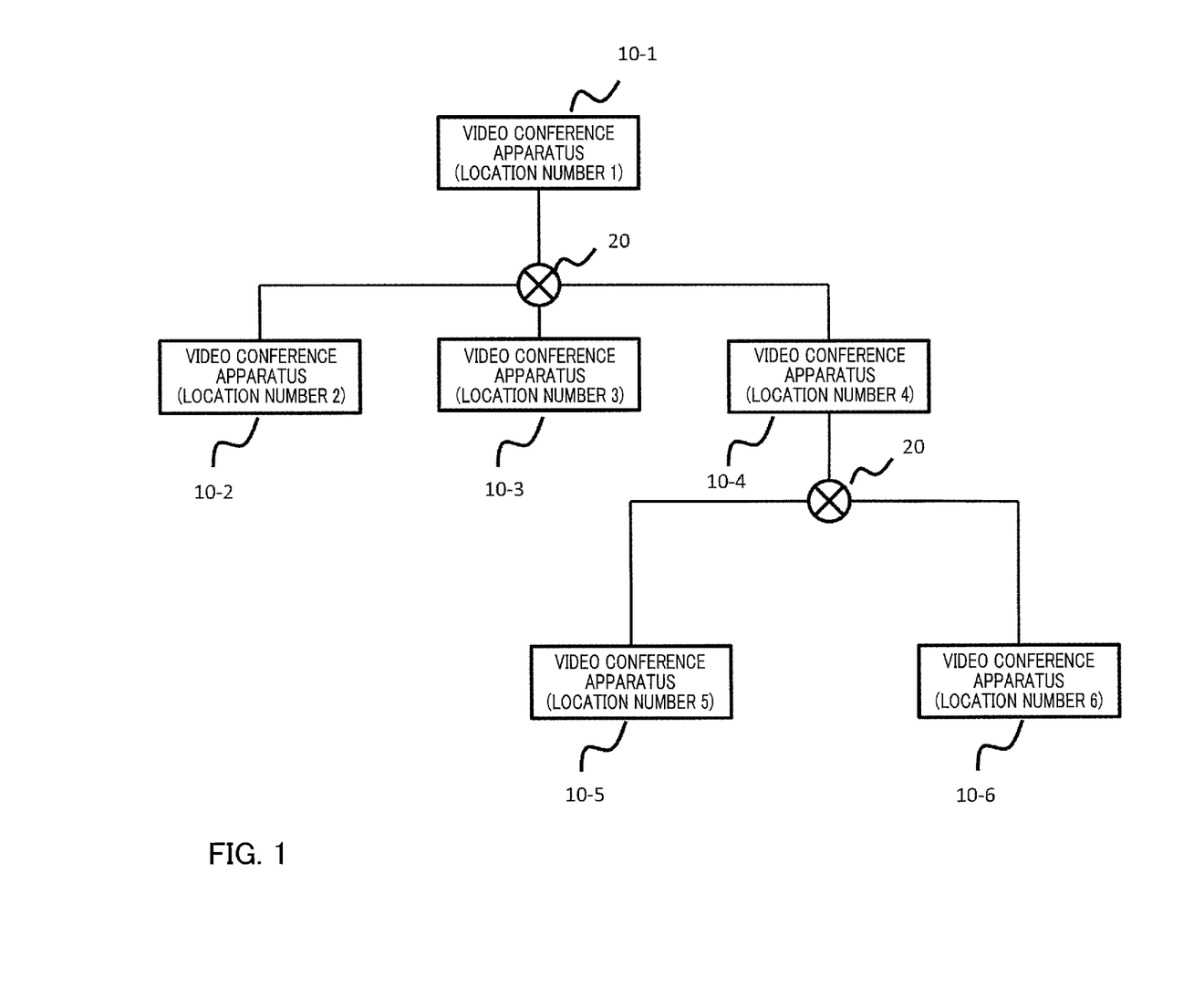
FIG. 1 is a diagram illustrating a configuration of a video conference system according to an embodiment of the present disclosure.

More specifically, in FIG. 1, three of the video conference apparatuses, which are video conference apparatuses 10-1, 10-4, and 10-5 (or 10-6), are connected in cascade. Hereinafter, a client location positioned in middle of a cascade connection, as location number 4 of FIG. 1, is referred to as "intermediate location."

The combined video data transmitted from video conference apparatuses 10-1 of the hosting location is received by video conference apparatuses 10-5 and 10-6 of the client locations via video conference apparatus 10-4 of the intermediate location. Video conference apparatuses 10-5 and 10-6 of the client locations display the combined video data received from video conference apparatus 10-4 of the intermediate location.

<Configuration of Video Conference Apparatus>

Figure 2:
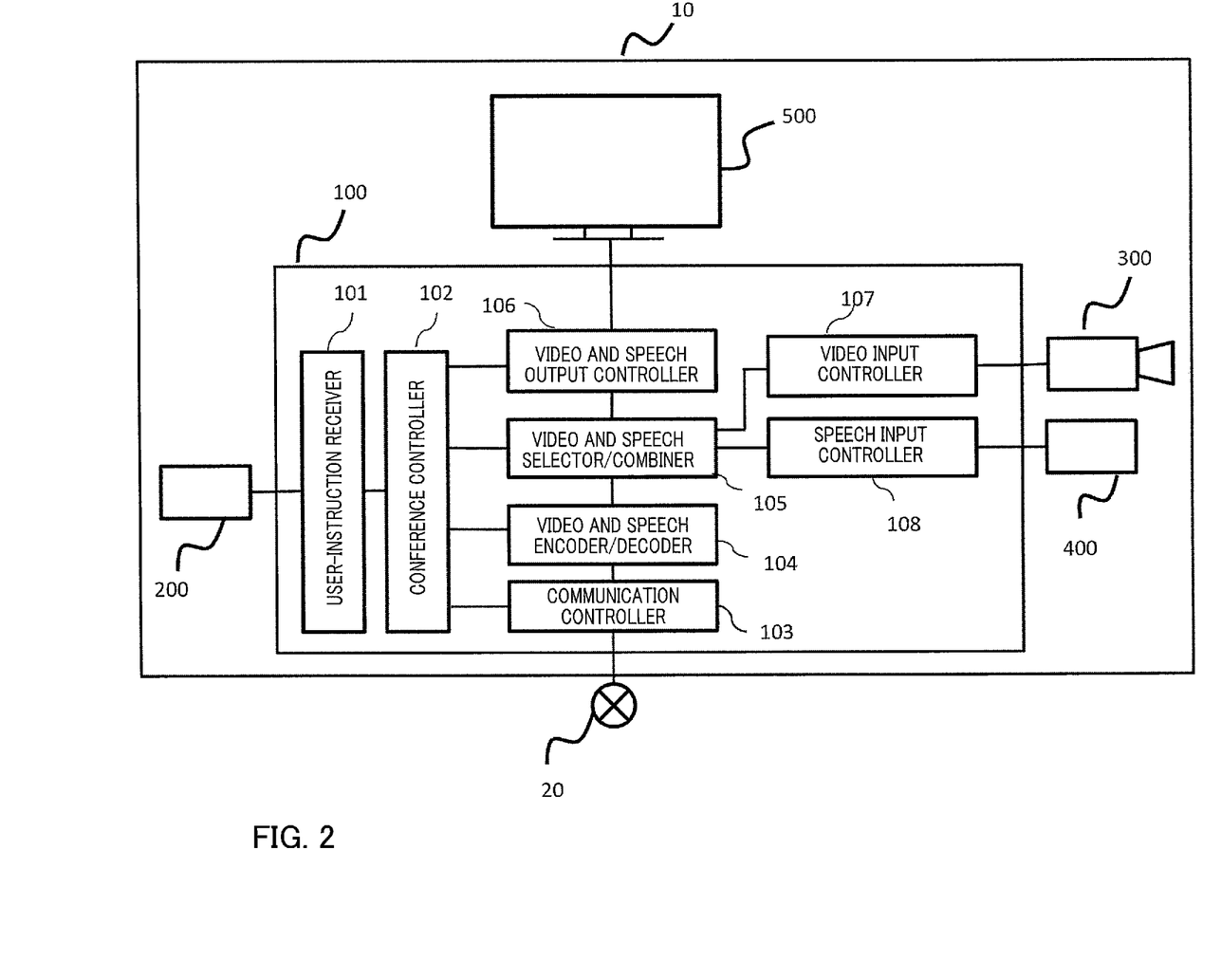
FIG. 2 is a block diagram illustrating a configuration of a video conference apparatus according to an embodiment of the present disclosure.

Next, a detailed description will be given of a configuration of video conference apparatus 10 according to an embodiment of the present disclosure with reference to FIG. 2. Note that, specific processing to video conference apparatus 10-4 of the intermediate location will be described, hereinafter.

Each video conference apparatus 10 includes main unit 100, user-operation input device 200, video input device 300, speech input device 400, and display device 500.

Main unit 100 connects to user operation input device 200, video input device 300, speech input device 400, and display device 500.

User-operation input device 200 detects an operation to select a location performed by a user and transmits a signal containing selected location information indicating the selected location to main unit 100 via a cable or radio. User-operation input device 200 is, typically, a remote controller or a touch panel.

Video-input device 300 outputs the video data obtained by capturing the location where main unit 100 is installed to main unit 100. Note that, the video data to be outputted from video-input device 300 includes video data saved in a PC, video data played back by a DVD player, and/or the like, in addition to the video data captured by a camera.

Speech input device 400 outputs the speech data and/or the like obtained by collecting speech in the location where main unit 100 is installed to main unit 100. Note that, the speech data to be outputted by speech input device 400 includes speech data paired with video data saved in a PC, speech data paired with video data played back by a DVD player, and/or the like, in addition to the speech data collected by a microphone.

Display device 500 displays, on a screen, the video data outputted from main unit 100 while outputting from a speaker (not illustrated) the speech data outputted from main unit 100.

Main unit 100 mainly includes user-instruction receiver 101, conference controller 102, communication controller 103, video and speech encoder/decoder 104, video and speech selector/combiner 105, video and speech output controller 106, video input controller 107, and speech input controller 108. Note that, video and speech encoder/decoder 104, video and speech selector/combiner 105, and video and speech output controller 106 form a display controller.

User-instruction receiver 101 receives the signal transmitted from user-operation input device 200, extracts the selected location information contained in the received signal, and outputs the selected location information to conference controller 102. The selected location information contains origination destination information (IP address or ISDN number) of each location participating in the video conference.

Conference controller 102 controls the timing of input and output of the data in communication controller 103, video and speech encoder/decoder 104, and video and speech selector/combiner 105, based on the selected location information inputted from user-instruction receiver 101. Moreover, conference controller 102 outputs the selected location information inputted from user-instruction receiver 101 to video and speech selector/combiner 105. Moreover, conference controller 102 controls call origination processing and call establishment processing and also monitors whether or not video data has been received in communication controller 103, based on the selected location information.

Communication controller 103 operates at timings according to the control made by conference controller 102. Communication controller 103 establishes a call with another video conference apparatus 10. After establishing a call, communication controller 103 receives, via network 20, packets containing video data and speech data transmitted by another video conference apparatus 10, and outputs the received packets to video and speech encoder/decoder 104. Further, after establishing a call, communication controller 103 transmits the packets containing the video data and speech data inputted from video and speech encoder/decoder 104 to another video conference apparatus 10 via network 20. Note that, communication controller 103 operates in accordance with a predetermined communication protocol. This communication protocol is, typically, SIP or H.323.

Video and speech encoder/decoder 104 operates at the timings in accordance with control by conference controller 102. Video and speech encoder/decoder 104 encodes the video data and speech data inputted from video and speech selector/combiner 105 and outputs the encoded data to communication controller 103. Moreover, video and speech encoder/decoder 104 decodes video data and speech data from another video conference apparatus 10 inputted from communication controller 103 and outputs the decoded video and speech data to video and speech selector/combiner 105.

Moreover, video and speech encoder/decoder 104 manages the network information of another video conference apparatus 10. The network information includes an apparatus type of each slave location (whether or not the apparatus is a mobile terminal, a packet loss frequency (the number of packet losses within a predetermined period), an IP address, an RTT, an estimated band, and/or the like of the apparatus.

Video and speech selector/combiner 105 operates at the timings in accordance with the control made by conference controller 102.

In a case where the location of video conference apparatus 10 is a hosting location, video and speech selector/combiner 105 of video conference apparatus 10 genereates combined video data obtained by combining a plurality of pieces of video data based on the video data received from another video conference apparatus 10 inputted from video and speech encoder/decoder 104 and on the video data inputted from video input controller 107, and in accordance with the number of locations of the the selected location information inputted from conference controller 102, and outputs the combined video data thus generated to video and speech encoder/decoder 104 and video and speech output controller 106.

Moreover, in a case where the location of video conference apparatus 10 is a hosting location, video and speech selector/combiner 105 of video conference apparatus 10 outputs the received speech data from another video conference apparatus 10 inputted from video and speech encoder/decoder 104 to video and speech output controller 106. Further, video and speech selector/combiner 105 generates combined speech data obtained by combining the received speech data from another video conference apparatus 10 inputted from video and speech encoder/decoder 104 and the speech data inputted from speech input controller 108 and outputs the combined speech data thus generated to video and speech encoder/decoder 104.

Note that, in a case where the location of video conference apparatus 10 is a client location other than an intermediate location, video and speech selector/combiner 105 of video conference apparatus 10 outputs the video data inputted from video input controller 107 to video and speech encoder/decoder 104 without processing and outputs the combined video data inputted from video and speech encoder/decoder 104 to video and speech output controller 106 without processing. Further, in a case where the location of video conference apparatus 10 is a client location other than an intermediate location, video and speech selector/combiner 105 of video conference apparatus 10 outputs the speech data inputted from speech input controller 108 to video and speech encoder/decoder 104 without processing and outputs the combined speech data inputted from video and speech encoder/decoder 104 to video and speech output controller 106 without processing.

Video and speech output controller 106 displays, on a screen of display device 500, the combined video data inputted from video and speech selector/combiner 105 while outputting the combined speech data from a speaker of display device 500 as speech.

Video input controller 107 outputs the video data inputted from video input device 300 to video and speech selector/combiner 105.

Speech input controller 108 outputs the speech data inputted from speech input device 400 to video and speech selector/combiner 105.

<Transition of Connection State of Video Conference Apparatus of Hosting Location>

Figure 3:
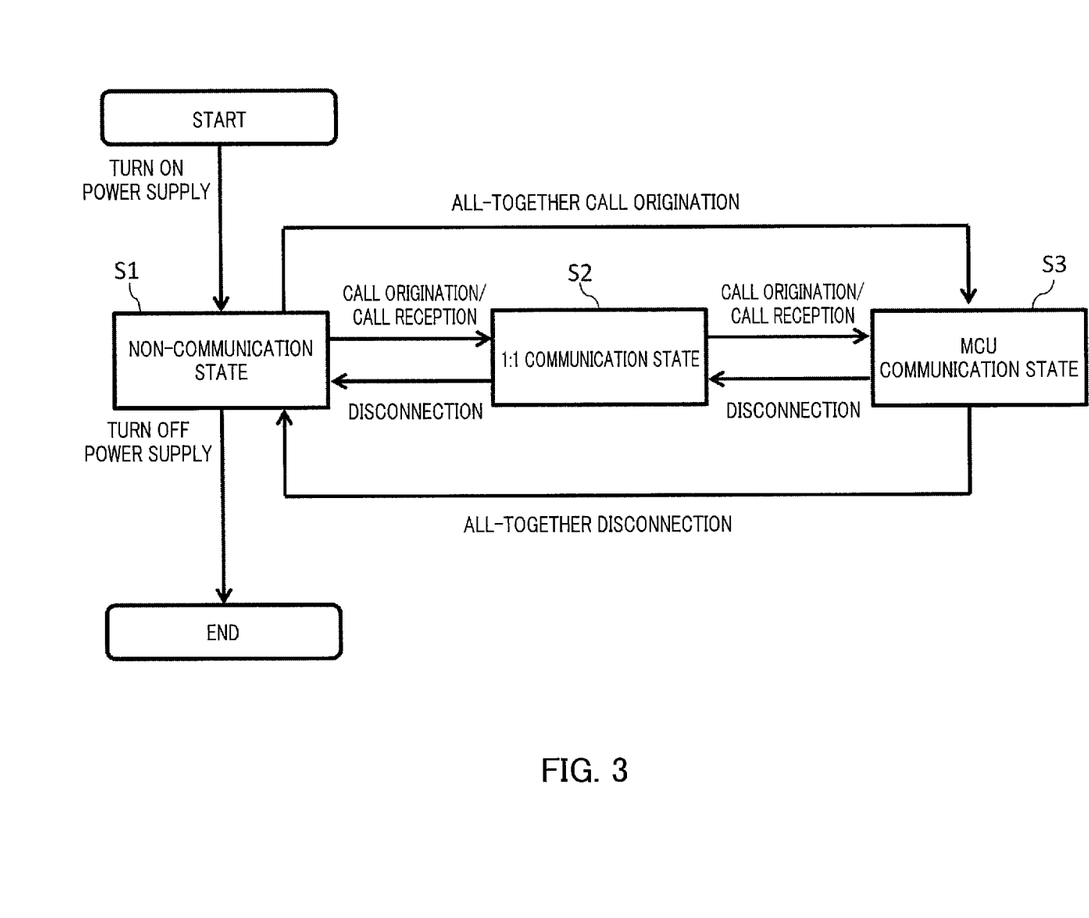
FIG. 3 is a state transition diagram illustrating a transition of a state of a video conference apparatus of a hosting location according to an embodiment of the present disclosure.

Next, a detailed description will be given of a transition of a connection state of video conference apparatus 10-1 of a hosting location with reference to FIG. 3.

Video conference apparatus 10-1 starts operation when a power supply is turned ON. Video conference apparatus 10-1 is in a non-communication state immediately after the power supply is turned ON (S1).

Video conference apparatus 10-1 connects to one other video conference apparatus 10-*i* (any integer of 2 to 4 in FIG. 3) in a non-communication state (S1), thereby turning into a one-to-one communication state with video conference apparatus 10-*i* (1:1 communication state) (S2). Video conference apparatus 10-1 turns into a non-communication state (S1) when disconnecting from video conference apparatus 10-*i* with which video conference apparatus 10-1 has been in a communication state in a one-to-one communication state (S2). Note that, video conference apparatus 10-1 ends operation when the power supply is turned OFF in a non-communication state (S1).

Moreover, video conference apparatus 10-1 connects to still another video conference apparatus 10-*j* ("j" is any integer from 2 to 4 other than "i" in FIG. 3), thereby turning into a communication state (MCU (multiple-point connection) communication state) with video conference apparatuses 10-*i* and 10-*j* of a plurality of locations (S3).

Video conference apparatus 10-1 turns into a one-to-one connection state (S2) when disconnecting from video conference apparatus 10-*j* with which video conference apparatus 10-*i* has been in a communication state, and turns into a non-communication state (S1) when also disconnecting from video conference apparatus 10-*i* with which video conference apparatus 10-1 has been in a communication state.

Further, video conference apparatus 10-1 turns into a communication state with all other video conference apparatuses 10-2 to 10-4 in a communication state (MCU communication state) (S3) when originating calls all together to all other video conference apparatuses 10-2 to 10-4 in a non-communication state (S1). Video conference apparatus 10 turns into a non-communication state (S1) when disconnecting all together from all other video conference apparatuses 10-2 to 10-4.

As a method for originating calls all together, for example, the following methods are possible: a method for manually inputting all origination destinations into to video conference apparatus 10-1 by a user at the time of originating calls; and a method for causing a user to select a list in which a plurality of pieces of origination destination information are previously stored in video conference apparatus 10-1. Further, as a method for identifying an origination destination, an IP address, a phone number, or an identification code is a possibility <Problems with Cascade Connection>

Next, a video loop that occurs in a case where video conference apparatus 10 is connected in cascade will be described with reference to FIG. 4.

Figure 4:
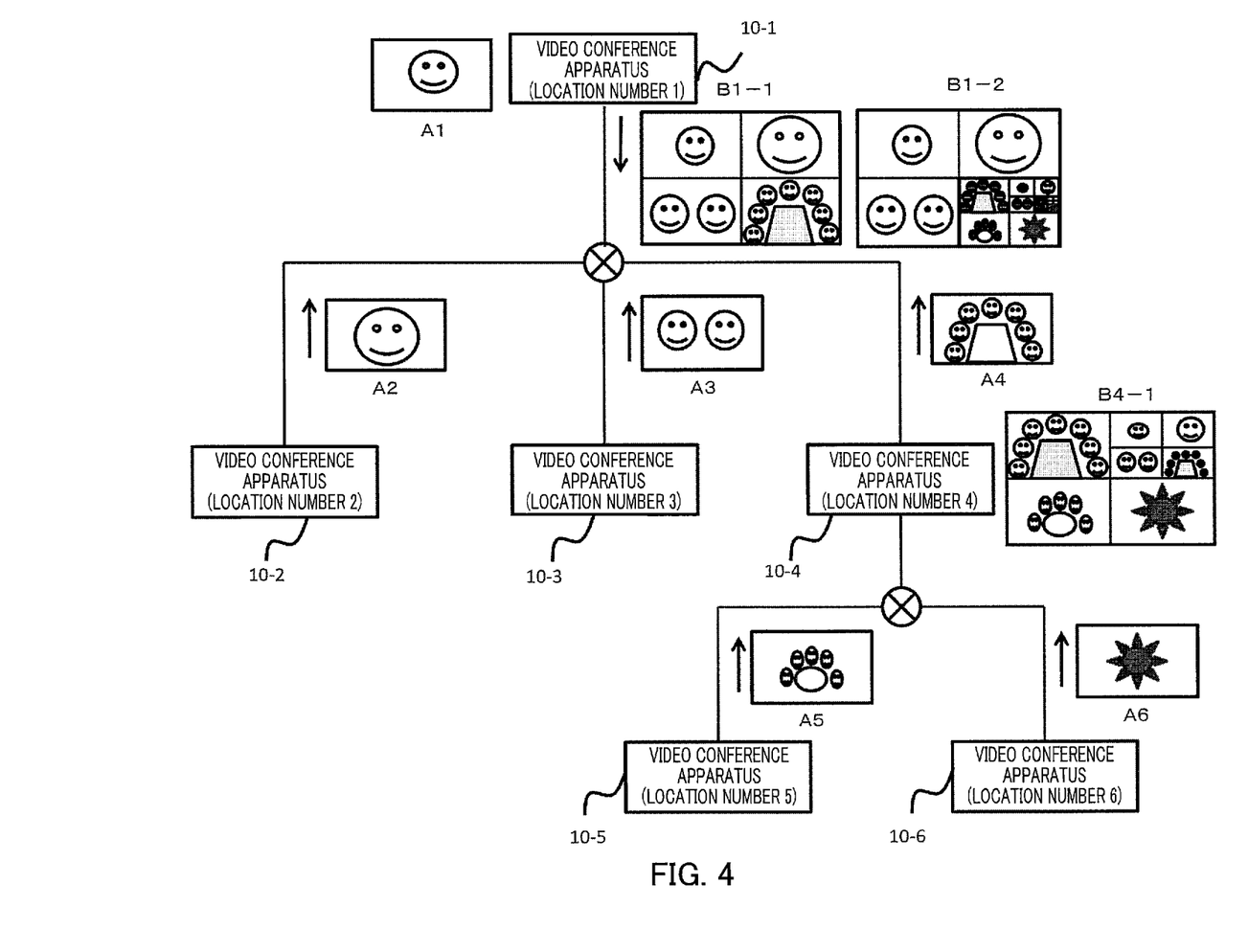
FIG. 4 is a diagram for describing a video loop that occurs in a case where video conference apparatuses are connected in cascade.

In FIG. 4, video data A1 is video data obtained in a hosting location (location number 1), and video data A2, A3, A4, A5, and A6 are pieces of video data obtained in client locations (location numbers 2 to 6), respectively.

Video conference apparatus 10-1 of the hosting location generates combined video data B1-1 by combining video data A1 obtained in the hosting location of video conference apparatus 10-1, and video data A2, A3, and A4 received respectively from video conference apparatuses 10-2 to 10-4 of client locations (location numbers 2 to 4) in connection, and displays combined video data B1-1 on display device 500. Further, video conference apparatus 10-1 transmits combined video data B1-1 to each of video conference apparatuses 10-2 to 10-4. Video conference apparatuses 10-2 and 10-3 display combined video data B1-1 on display devices 500.

In a traditional video conference system, no distinction is made between a hosting location and an intermediate location, so that video conference apparatus 10-4 of an intermediate location performs video data combination processing as in the case of video conference apparatus 10-1 of the hosting location. More specifically, video conference apparatus 10-4 generates combined video data B4-1 by combining video data A4 obtained in the hosting location of video conference apparatus 10-4, and video data B1-1, A5, and A6 received respectively from video conference apparatuses 10-1, 10-5, and 10-6 in connection, and displays combined video data B4-1 on display device 500. Further, video conference apparatus 10-4 transmits combined video data B4-1 to each of video conference apparatuses 10-1, 10-5, and 10-6. Video conference apparatuses 10-5 and 10-6 display combined video data B4-1 on display devices 500.

When receiving combined video data B4-1 from video conference apparatus 10-4, video conference apparatus 10-1 generates combined video data B1-2 by combining video data A1, A2, A3, and combined video data B4-1, and displays combined video data B1-2 on display device 500. Further, video conference apparatus 10-1 transmits combined video data B1-2 to each of video conference apparatuses 10-2 to 10-4.

When receiving combined video data B1-2 from video conference apparatus 10-1, video conference apparatus 10-4 generates combined video data B4-2 (not illustrated) by combining video data A4, A5, A6, and combined video data B1-2, and displays combined video data B4-2 on display device 500. Further, video conference apparatus 10-4 transmits combined video data B4-2 to each of video conference apparatuses 10-1, 10-5, and 10-6.

Hereinafter, repeating transmission of combined video data B1-$k$ ("k" is an integer equal to 3 or greater) by video conference apparatus 10-1 of the hosting location and transmission of combined video data B4-$k$ ("k" is an integer equal to 3 or greater) by video conference apparatus 10-4 of the intermediate location causes an occurrence of video loop in which video to be displayed becomes mirror alignment video.

As described above, a video loop occurs when video conference apparatus 10 of an intermediate location performs video data combining processing as in the case of video conference apparatus 10 of a hosting location in a case where video conference apparatus 10 is connected in cascade.

Accordingly, in order to prevent a video loop, video conference apparatus 10-4 of the intermediate location needs to perform specific processing on the video data. The present inventor has arrived at the present invention with an attention to this point.

<Specific Processing of Video Conference Apparatus 10-4 of Intermediate Location>

Next, a description will be given of video conference apparatus 10-4 of an intermediate location according to the present embodiment. As a premise, a mode in which a video conference apparatus functions as an intermediate location (hereinafter, referred to as "cascade mode") is added to video conference apparatus 10-4 of the present embodiment, and users are allowed to select the cascade mode and a cascade destination by operating user-operation input device 200. The term "cascade destination" refers to a video conference apparatus of a hosting location (video conference apparatus 10-1 in FIG. 1 or the like), or a video conference apparatus on an upstream side linking to the hosting location. Note that, in addition to the cascade mode, such modes include a discussion mode, a presentation mode and/or the like in which the video conference apparatus functions as a hosting location. The discussion mode refers to a mode in which video of all locations is displayed for the location of this video conference apparatus and each client location. The presentation mode refers to a mode in which video of all locations is displayed for the location of this video conference apparatus, and video of only the hosting location is displayed for each client location.

User-instruction receiver 101 receives the signal transmitted from user-operation input device 200, extracts the mode information contained in the received signal, and outputs the mode information to conference controller 102. The mode information is information which indicates the mode selected by a user. In case of the cascade mode, the mode information contains information indicating a cascade destination.

Conference controller 102 outputs the mode information inputted from user-instruction receiver 101 to communication controller 103 and video and speech selector/combiner 105. Communication controller 103 and video and speech selector/combiner 105 recognize whether the location of this video conference apparatus is a hosting location, an intermediate location, or a client location other than an intermediate location.

In case of the cascade mode, that is, in a case where the location of this video conference apparatus is an intermediate location, communication controller 103 receives, via network 20, packets containing the video data and speech data transmitted by video conference apparatus 10-1 of the cascade destination and outputs the packets to video and speech encoder/decoder 104 and also transmits the packets, via network 20, to video conference apparatuses 10-5 and 10-6 of connection locations other than the cascade destination. Moreover, in case of the cascade mode, communication controller 103 transmits the packets containing the video data and speech data inputted from video and speech encoder/decoder 104 to video conference apparatus 10-1 of the cascade destination via network 20.

In case of the cascade mode, video and speech selector/combiner 105 detects a sound volume of the speech data of the location of this video conference apparatus and a connection location other than the cascade destination (sound-volume detector). Video and speech selector/combiner 105 selects the video data of a location (where speech is made (hereinafter, referred to "speech region")) of a maximum sound-volume among connection locations other than the location of this video conference apparatus and the cascade destination, and outputs the video data to video and speech encoder/decoder 104. Moreover, in case of the cascade mode, video and speech selector/combiner 105 outputs the combined video data from video conference apparatus 10-1 of the cascade destination inputted from video and speech encoder/decoder 104 to video and speech output controller 106 without processing.

Moreover, in case of the cascade mode, video and speech selector/combiner 105 generates combined speech data by combining the speech data received from other video conference apparatuses 10-5 and 10-6 inputted from video and speech encoder/decoder 104, and the speech data inputted from speech input controller 108, and outputs the combined speech data thus generated to video and speech encoder/decoder 104. Moreover, in case of the cascade mode, video and speech selector/combiner 105 outputs the combined speech data inputted from video conference apparatus 10-1 of the cascade destination inputted from video and speech encoder/decoder 104 to video and speech output controller 106 without processing.

<Transition of Connection State of Video Conference Apparatus of Intermediate Location>

Figure 5:
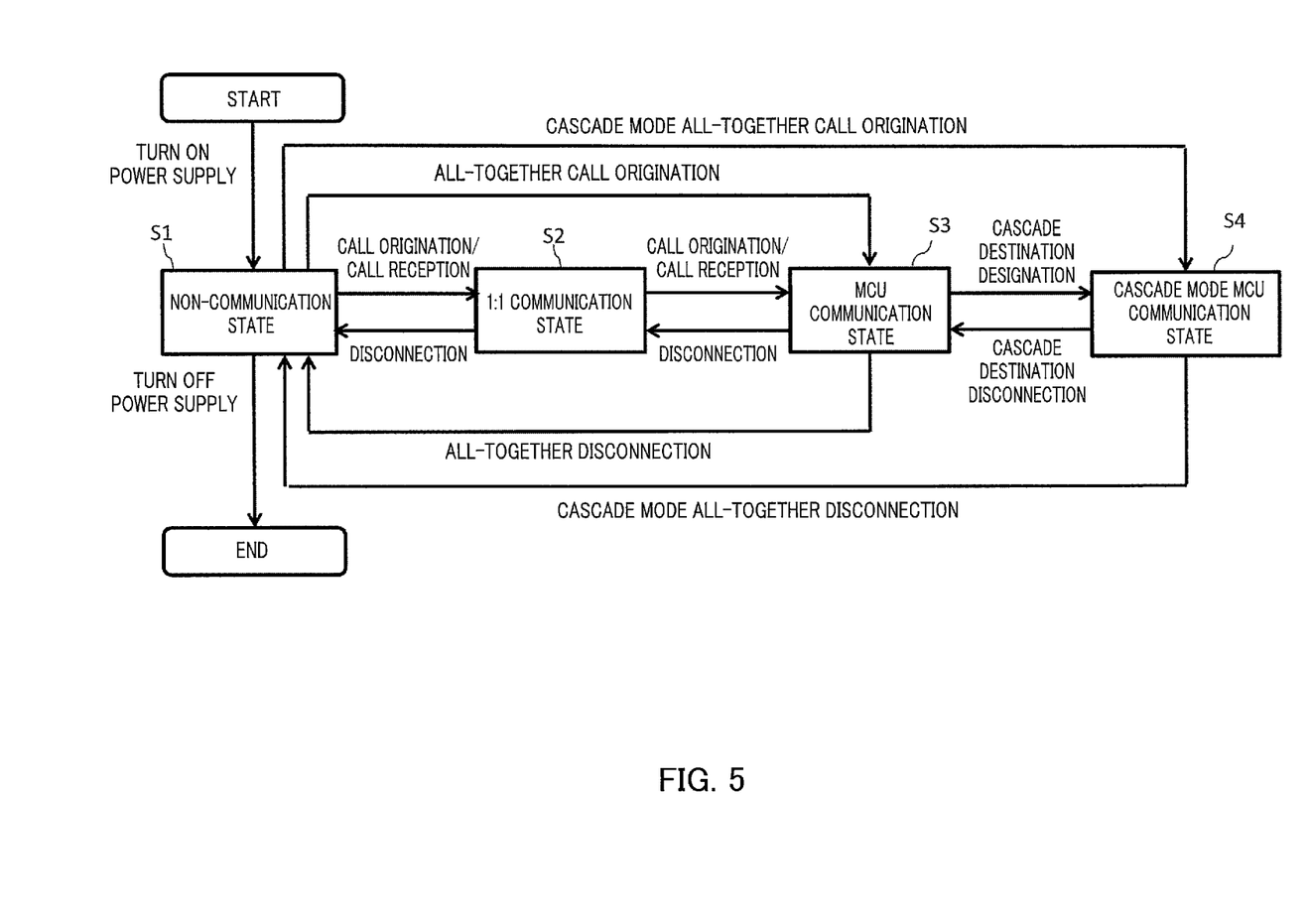
FIG. 5 is a state transition diagram illustrating a transition of a state of a video conference apparatus of an intermediate location according to an embodiment of the present disclosure.

Next, a transition of a connection state of video conference apparatus 10-4 of an intermediate location will be described in detail with reference to FIG. 5.

Video conference apparatus 10-4 starts operation when the power supply is turned ON. Video conference apparatus 10 is in a non-communication state immediately after the power supply is turned ON (S1).

Video conference apparatus 10-4 connects to one other video conference apparatus 10-*i* ("i" is any integer of 5 or 6 in FIG. 5) in a non-communication state (S1), thereby turning into a one-to-one communication state with video conference apparatus 10-*i* (1:1 communication state) (S2). Video conference apparatus 10-4 turns into a non-communication state (S1) when disconnecting from video conference apparatus 10-*i* with which video conference apparatus 10-4 has been in a communication state in a one-to-one communication state (S2). Note that, video conference apparatus 10-4 ends operation when the power supply is turned OFF in a non-communication state (S1).

Moreover, video conference apparatus 10-4 connects to still another video conference apparatus 10-*j* ("j" is any integer 5 or 6 other than "i" in FIG. 5), thereby turning into a communication state (MCU communication state) with video conference apparatuses 10-*i* and 10-*j* of a plurality of locations (S3). At this time, video conference apparatus 10-4 acts as a hosting location.

Video conference apparatus 10-4 turns into a one-to-one communication state (S2) when disconnecting from video conference apparatus 10-*j* with which video conference apparatus 10-4 has been in a communication state, and turns into a non-communication state (S1) when also disconnecting from video conference apparatus 10-*j* with which video conference apparatus 10-4 has been in a communication state.

Further, video conference apparatus 10-4 turns into a communication state (MCU communication state) with all other video conference apparatuses 10-5 and 10-6 (S3) when originating calls all together to all other video conference apparatuses 10-5 and 10-6 in a non-communication state (S1). Video conference apparatus 10 turns into a non-communication state (S1) when disconnecting all together from all other video conference apparatuses 10-5 and 10-6.

Further, video conference apparatus 10-4 turns into an MCU communication state of a cascade mode (S4) from the MCU communication state (S3) by connecting to video conference apparatus 10-1 while designating video conference apparatus 10-1 as the cascade destination. At this time, video conference apparatus 10-4 acts as an intermediate location.

Video conference apparatus 10-4 turns into a normal MCU communication state (S3) when disconnecting from video conference apparatus 10-1 of the cascade destination with which video conference apparatus 10-4 has been in a communication state.

Further, video conference apparatus 10-4 turns into an MCU communication state of the cascade mode (S4) with all other video conference apparatuses 10-1, 10-5 and 10-6 when originating calls all together to all other video conference apparatuses 10-1, 10-5 and 10-6 while designating video conference apparatus 10-1 as the cascade destination. Video conference apparatus 10 turns into a non-communication state (S1) when disconnecting all together from all other video conference apparatuses 10-1, 10-5 and 10-6.

As a method for originating calls all together, for example, the following methods are possible: a method for manually inputting all origination destinations including a cascade destination into to video conference apparatus 10-4 by a user at the time of originating calls; and a method for causing a user to select a list in which a plurality of pieces of origination destination information are previously stored in video conference apparatus 10-4. Further, as a method for identifying an origination destination, an IP address, a phone number, or an identification code is a possibility.

<Operation of Video Conference Apparatus of Intermediate Location>

Figure 6:
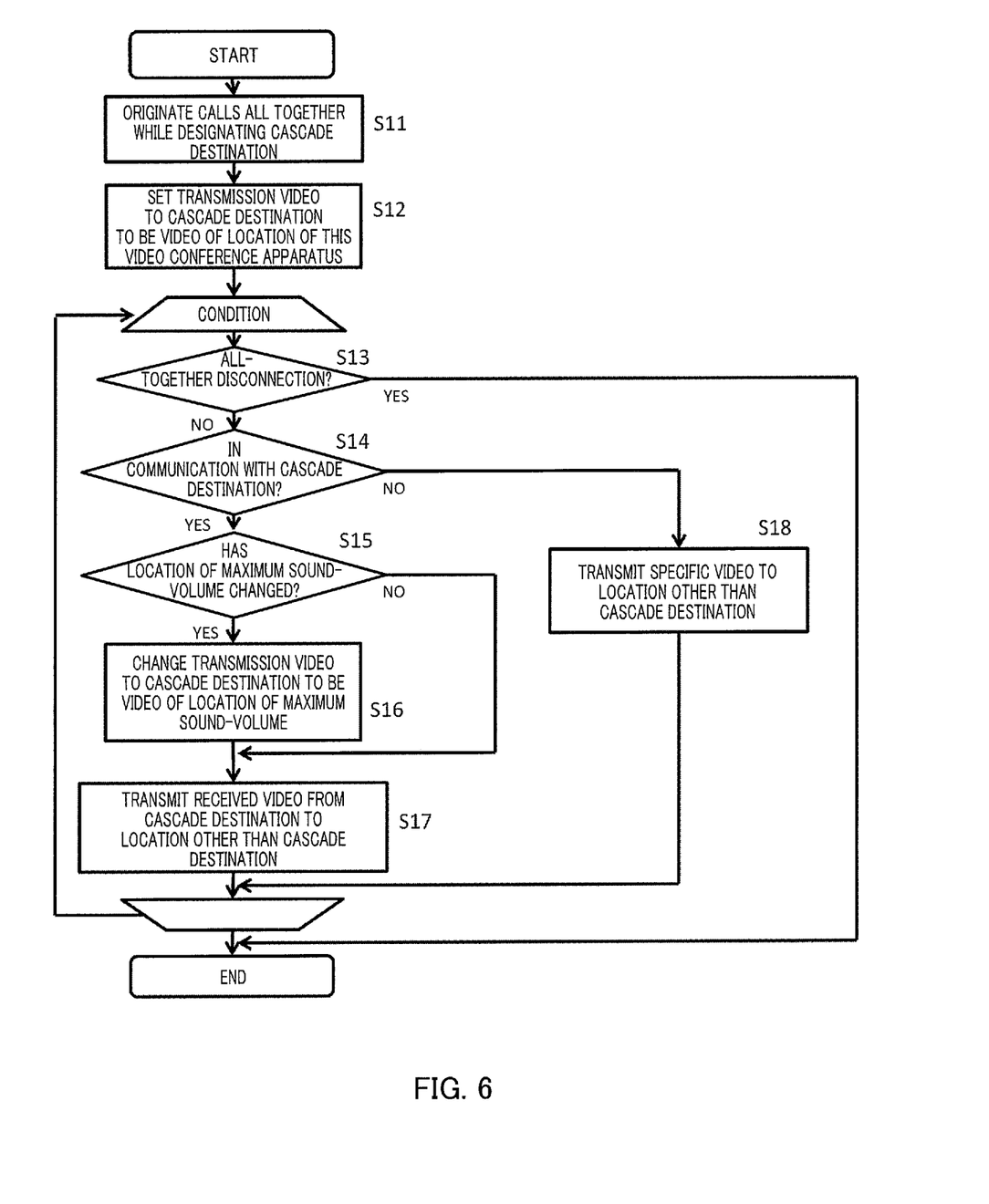
FIG. 6 is a flowchart illustrating an operation of a case where a video conference apparatus according to an embodiment of the present disclosure acts as an intermediate location.

Next, an operation of a case where video conference apparatus 10-4 acts as an intermediate location will be described in detail with reference to FIG. 6.

User-instruction receiver 101 receives the signal transmitted from user-operation input device 200, extracts the selected location information and the mode information contained in the received signal, and outputs the extracted information to conference controller 102.

Conference controller 102 controls communication controller 103 such that communication controller 103 designates, as the cascade destination, video conference apparatus 10-1 indicated in the mode information, and originates calls all together as the cascade mode to video conference apparatuses 10-1, 10-5 and 10-6 installed respectively in the locations included in the selected location information. Thus, communication controller 103 originates calls all together to video conference apparatuses 10-1, 10-5 and 10-6 of the selected locations while designating video conference apparatus 10-1 as the cascade destination (S11).

Further, conference controller 102 outputs the mode information to video and speech selector/combiner 105. Video and speech selector/combiner 105 selects video data of the location of this video conference apparatus, and communication controller 103 transmits the video data of the location of this video conference apparatus to video conference apparatus 10-1 of the cascade destination (S12).

In a case where the location of the maximum sound-volume does not change (S15: NO) in a state in which no disconnection is made (S13: NO) and communication with the cascade destination continues (S14: YES) thereafter, communication controller 103 continues transmission of video data of the location of this video conference apparatus to video conference apparatus 10-1. Meanwhile, in a case where the location of the maximum sound-volume changes (S15: YES), video and speech selector/combiner 105 selects video data of video conference apparatus 10-5 or video conference apparatus 10-6 of the location of the maximum sound-volume, and communication controller 103 transmits the video data of the video conference apparatus of the location of the maximum sound-volume to video conference apparatus 10-1 of the cascade destination (SLY). Thereafter, video conference apparatus 10-4 transmits video data of the location of the maximum sound-volume (any of video conference apparatuses 10-4, 10-5, and 10-6) to video conference apparatus 10-1 (S15, SLY) every time the location of the maximum sound-volume changes.

Moreover, video conference apparatus 10-4 transmits the combined video data received from video conference apparatus 10-1 of the cascade destination to video conference apparatuses 10-5 and 10-6 of connection locations other than the cascade destination (S17).

Note that, in a case where all-together disconnection is made (S13: YES), video conference apparatus 10-4 ends the processing.

Further, in a case where no all-together disconnection is made (S13: NO), but communication with the cascade destination is disconnected (S14: NO), video conference apparatus 10-4 transmits specific video data to video conference apparatuses 10-5 and 10-6 of connection locations other than the cascade destination (S18).

Note that, although a description has been given with the example in which video conference apparatus 10-4 of an intermediate location transmits video data of the location of the maximum sound-volume to video conference apparatus 10-1 of the cascade destination, the present embodiment is not limited to this example, and for example, a configuration may be employed in which video data of a location selected by a user is always transmitted.

<Effects>

As has been described thus far, in this embodiment, in a case where a video conference apparatus is in a client location positioned in middle of a cascade connection, one video data is selected from among video data of a location other than the location of the video conference apparatus and the cascade destination and transmitted to the video conference apparatus of the cascade destination. Thus, even in a case where a plurality of video conference apparatuses are connected in cascade, a video loop can be prevented.

Note that, the present disclosure is not limited to the types, arrangement and/or the number of components described in the embodiment described above, and they may be changed as appropriate without departing from the spirit and scope of the present invention by, for example, appropriately substituting the components with those having equivalent operational effects.

In the embodiment described above, a description has been given with the example in which a video conference system has six locations, for example, but the number of locations is not limited in the present disclosure.

INDUSTRIAL APPLICABILITY

The present disclosure is suitable for use in video conference apparatuses of a video conference system connecting between a plurality of regions.

REFERENCE SIGNS LIST

10 Video conference apparatus
100 Main unit
101 User-instruction receiver
102 Conference controller
103 Communication controller
104 Video and speech encoder/decoder
105 Video and speech selector/combiner
106 Video and speech output controller
107 Video input controller
108 Speech input controller
200 User-operation input device
300 Video input device
400 Speech input device
500 Display device

The invention claimed is:

1. A video conference apparatus that simultaneously connects to each of a plurality of video conference apparatuses of other locations, the video conference apparatus comprising:
   a video inputter that obtains video data of a location of the video conference apparatus; wherein the inputter that inputs whether the video conference apparatus is located in the middle of the cascade connection or not, wherein, in response to the input from the inputter, the selection by the selector/combiner and the video data to be transmitted by the communication controller are changed;
   a communication controller that receives video data of each of the other locations from the plurality of video conference apparatuses of the other locations; and
   a selector/combiner that generates combined video data resulting from combining the video data of the location of the video conference apparatus and the video data of each of the other locations, or that selects one video data from among the video data of the video conference apparatus and the video data of each of the other locations, wherein,
   in a case where the video conference apparatus is in a client location not located in middle of a cascade connection in which the video conference apparatus connects to, as a cascade destination, a video conference apparatus of a hosting location or an upstream side video conference apparatus, while the video conference apparatus also connects to a video conference apparatus of a location other than the cascade destination, the upstream side video conference apparatus being a video conference apparatus linking to the hosting location, the selector/combiner selects video data of the location of the video conference apparatus and a location of the cascade destination, and the communication controller transmits the video data selected by the selector/combiner to a video conference apparatus of the cascade destination and the location other than the cascade destination; and
   in a case where the video conference apparatus is in a client location located in middle of a cascade connection in which the video conference apparatus connects to, as a cascade destination, a video conference apparatus of a hosting location or an upstream side video conference apparatus, while the video conference apparatus also connects to a video conference apparatus of a location other than the cascade destination, the upstream side video conference apparatus being a video conference apparatus linking to the hosting location, the selector/combiner selects one of video data of the location of the video conference apparatus and a location other than the cascade destination, and the communication controller transmits the video data selected by the selector/combiner to a video conference apparatus of the cascade destination and transmits video data received from the video conference apparatus of the cascade destination to the location other than the cascade destination, the video conference apparatus further comprising an inputter that inputs whether the video conference apparatus is located in the middle of the cascade connection or not, wherein, in response to the input from the inputter, the selection by the selector/combiner and the video data to be transmitted by the communication controller are changed.

2. The video conference apparatus according to claim 1, further comprising: a sound-volume detector that detects a sound volume of the location of the video conference apparatus and a sound volume of each of the other locations, wherein in a case where the video conference apparatus is in a client location located in middle of the cascade connection, the selector/combiner selects video data of a location where the sound-volume is maximum.

3. The video conference apparatus according to claim 1, wherein the video conference apparatus of the client location transmits to and receives from the video conference apparatus of the cascade destination.

* * * * *